United States Patent [19]

Millsapps, Jr.

[11] 4,276,946
[45] Jul. 7, 1981

[54] BIASED LUBRICANT COMPENSATOR FOR AN EARTH BORING DRILL BIT

[75] Inventor: Stuart C. Millsapps, Jr., Houston, Tex.

[73] Assignee: Hughes Tool Company, Houston, Tex.

[21] Appl. No.: 885,723

[22] Filed: Mar. 13, 1978

Related U.S. Application Data

[63] Continuation-in-part of Ser. No. 814,609, Jul. 11, 1977, abandoned.

[51] Int. Cl.$^3$ .............................................. E21B 10/22
[52] U.S. Cl. ................................. 175/228; 76/108 A; 184/6.14; 184/1 R; 141/7; 141/114; 141/115
[58] Field of Search ................... 175/228, 229, 227; 308/8.2; 141/7, 115, 116; 184/1, 45 R, 6.14; 138/30, 20; 76/108 A, 101 E

[56] References Cited

U.S. PATENT DOCUMENTS

| | | | |
|---|---|---|---|
| 2,380,866 | 7/1945 | Overbeke | 138/30 |
| 2,480,558 | 8/1949 | Kiss | 138/30 |
| 3,578,038 | 5/1971 | Burford | 141/7 |
| 3,847,182 | 11/1974 | Geer | 138/30 |
| 3,917,028 | 11/1975 | Garner | 175/228 |
| 3,960,179 | 6/1976 | Zahid | 138/26 |
| 4,014,595 | 3/1977 | Dolezal | 308/8.2 |
| 4,051,920 | 10/1977 | Reinsma | 141/7 |
| 4,055,225 | 10/1977 | Millsapps | 175/228 |

Primary Examiner—William F. Pate, III
Attorney, Agent, or Firm—Robert A. Felsman

[57] ABSTRACT

An improved pressure compensator for earth boring drill bits for minimizing the pressure differential between the lubricant and the well bore. A flexible diaphragm is located in the lubricant reservoir for separating the lubricant from the borehole fluid. The diaphragm is positioned in the reservoir so that a substantial void space exists on the borehole fluid side of the reservoir. A retainer holds the diaphragm in this position, requiring a positive lubricant pressure to stretch the diaphragm in order to fill the void space. For lubricating the bit, the lubricant is introduced under pressure sufficient to stretch the diaphragm. The lubricant pressure is then released, allowing the compensator to return to its original shape which in turn causes the excess lubricant to be expelled. This assures complete filling and a desired void space.

12 Claims, 4 Drawing Figures

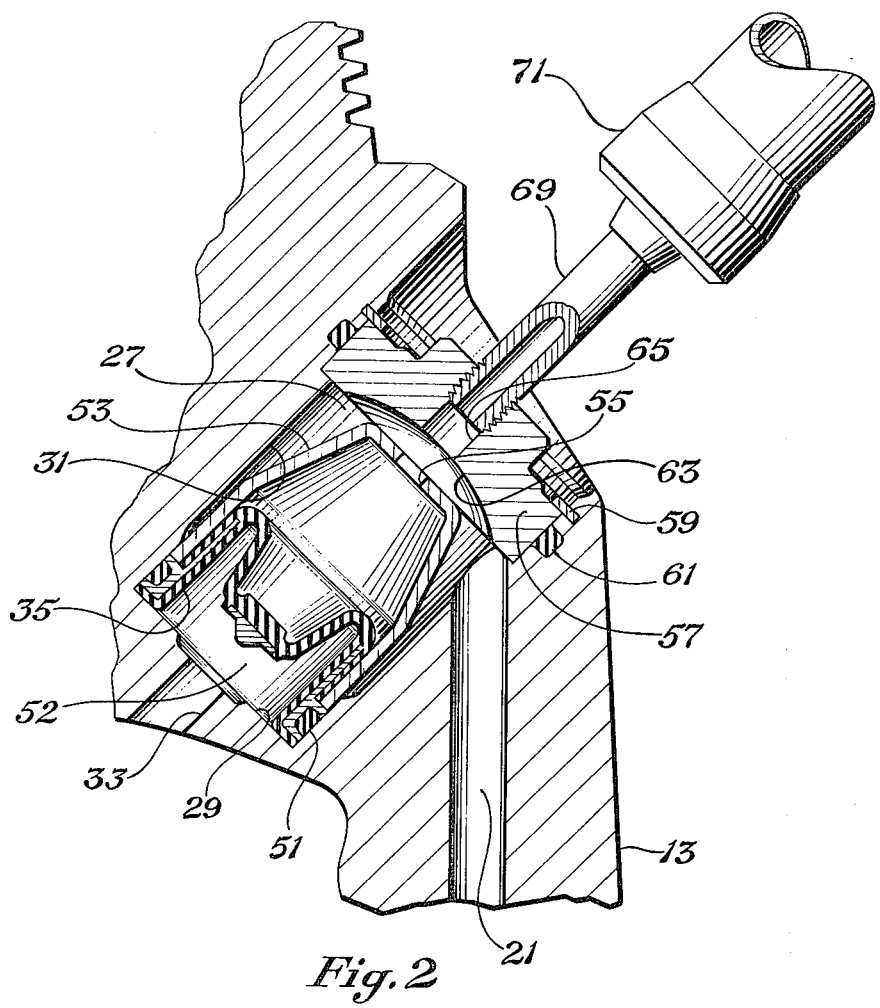
Fig.2
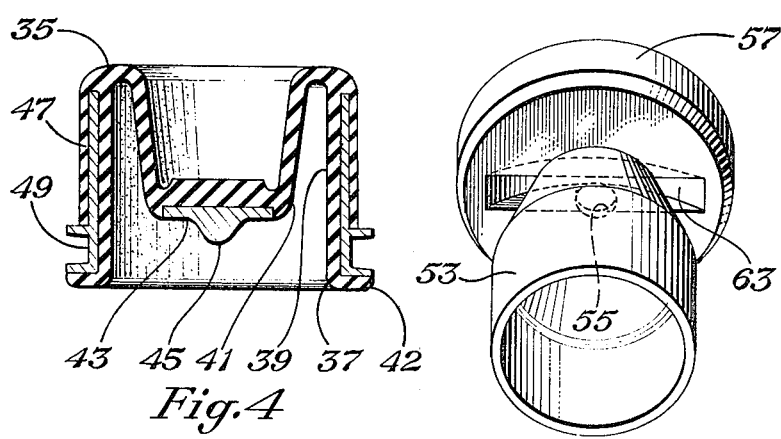
Fig.4
Fig.3

BIASED LUBRICANT COMPENSATOR FOR AN EARTH BORING DRILL BIT

CROSS REFERENCE TO RELATED APPLICATIONS

This is a continuation-in-part of application Ser. No. 814,609, filed July 11, 1977 now abandoned.

BACKGROUND OF THE INVENTION

1. Field of the Invention

This invention relates in general to earth boring drill bits and in particular to an improved pressure compensator in an earth boring drill bit.

2. Description of the Prior Art

Earth penetrating tools, including the rotatable cutter-type earth boring drill bit, commonly used lubrication systems that include a pressure compensator to limit the pressure differential between the lubricant and the pressure in the wellbore. A typical type includes a flexible diaphragm located in the lubricant reservoir and separating the lubricant from the borehole fluid. A portion of the diaphragm moves in response to the pressure differential across it tending to equalize the pressure differential between the lubricant reservoir pressure and the borehole fluid pressure.

Temperature increase in the lubricant as the bit is lowered into the well and due to friction heat while rotating causes expansion of the lubricant. Temperature increase may also cause the lubricant to evolve gaseous hydrocarbons. If the drill bit is of the type having positive seals between the cutter and bearing shaft that prevent egress of lubricant, thermal increase results in a pressure build-up in the system that can cause the diaphragm to be damaged as it is pressed against the port leading to the exterior. Excess internal pressure build-up can also damage the seal between the cutter and bearing shaft. A drill bit that contains positive seals is shown in U.S. Pat. No. 3,476,195, while a drill bit having the type of seals that release lubricant at a selected pressure is shown in U.S. Pat. No. 3,230,020.

One device used to reduce the internal pressure build-up in a positively sealed bit is a pressure relief valve, such as shown in U.S. Pat. No. 3,476,195 and in U.S. Pat. No. 3,942,596. Since failure of a pressure relief valve can destroy the effectiveness of the entire lubrication system, it is advantageous to eliminate the valve if internal pressure increases can be minimized by other means.

One way to minimize pressure build-up in a positively sealed bit without a pressure relief valve is to allow room in the reservoir for expansion. Since a relatively high pumping pressure is required to assure complete filling, one means for allowing room for expansion is to remove lubricant after the pressure is released. Another means for allowing expansion space is to use an extra thick compensator cap for filling, replacing it with a thinner cap for use, thereby leaving a void space in the reservoir as shown in U.S. Pat. No. 3,917,028. While these techniques are successful, improvements are desired.

SUMMARY OF THE INVENTION

It is a general object of this invention to provide an improved lubricant system for sealed earth boring drill bits and a method of filling the same with lubricant.

It is a further object of this invention to provide an improved means for reducing internal pressure build-up in the lubricant system of a sealed earth boring drill bit.

It is a further object of this invention to provide an improved means for reducing internal pressure build-up in the lubricant system of a sealed earth boring drill bit that allows complete filling of lubricant, and does not require a pressure relief valve.

In accordance with these objects, an improved lubricant system for an earth boring drill bit is provided that utilizes bias means to bias the diaphragm in its retaining cavity to a position with a substantial void space between the diaphragm and reservoir on the borehole fluid side of the diaphragm. The bias means preferably includes a retainer ring that retains the diaphragm in an intermediate position so that it must stretch in order to fill the void space on the borehole fluid side of the diaphragm. As the lubricant expands, the diaphragm stretches, increasing the volume on the lubricant side of the reservoir, and reducing pressure build-up. To assure complete filling, the lubricant is pumped into the reservoir to a pressure sufficient to stretch the diaphragm and fill substantially all of the void space. The pressure is then released, allowing the diaphragm to return to its normal state, and expelling lubricant.

BRIEF DESCRIPTION OF THE DRAWINGS

FIG. 2 is an enlarged partial cross sectional view of the pressure compensator of the drill bit of FIG. 1, with a nozzle for filling lubricant shown attached.

FIG. 3 is a perspective view of the protector and compensator cap of the pressure compensator shown in FIG. 1.

FIG. 4 is a cross sectional view of the diaphragm of the pressure compensator shown in FIG. 1.

DESCRIPTION OF THE PREFERRED EMBODIMENT

Figure 1:
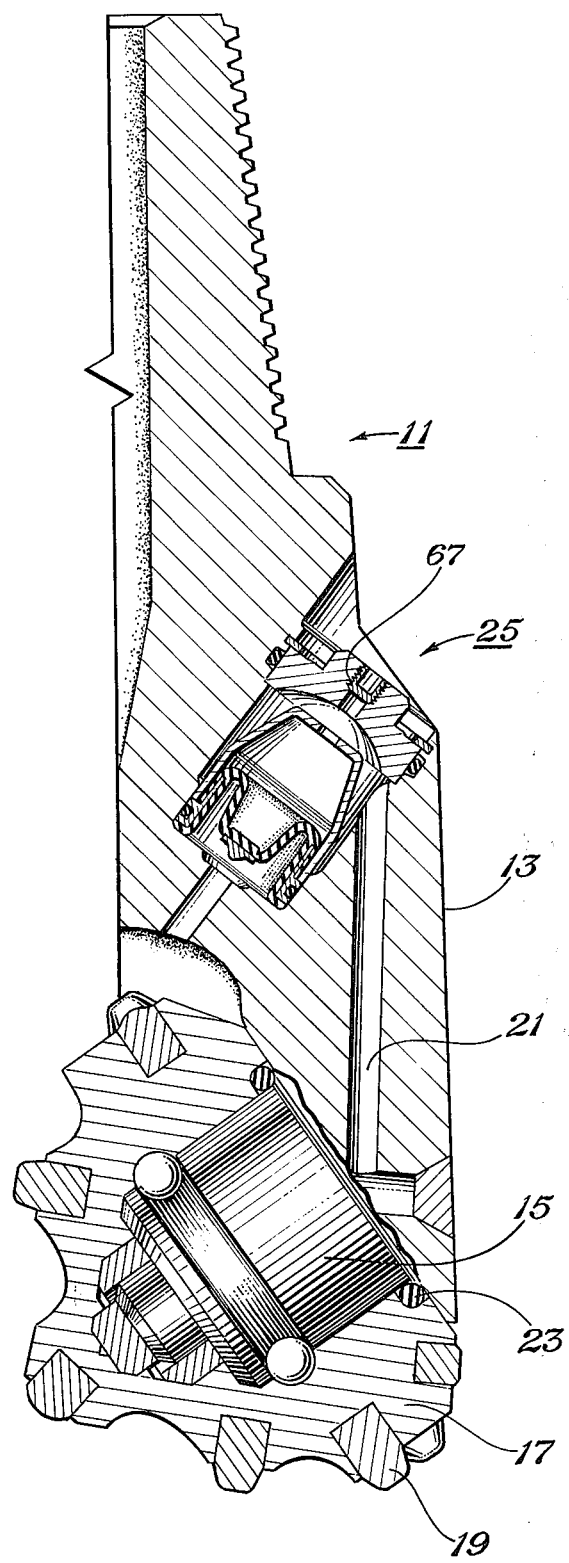
FIG. 1 is a partial cross sectional view of an earth boring drill bit constructed in accordance with this invention.

The numeral 11, in FIG. 1 of the drawings, designates a lubricated, rotatable, cutter-type earth boring drill bit having a body formed in three head sections 13, of which one is shown. Each section contains a depending bearing pin or shaft 15 that supports a rotatable cutter 17 having earth disintegrating teeth 19. Lubricant passages 21 supply lubricant to the bearing surfaces between the bearing pin 15 and cutter 17. An O-ring seal 23 prevents borehole fluid from entering the bearing surface, and also prevents lubricant from leaking past to the borehole. A seal of this type is shown and described in U.S. Pat. 3,397,928. A pressure compensator system 25 helps provide lubricant through passage 21 to the bearing pin 15, and limits the pressure differential across seal 23.

Referring to FIG. 2, the pressure compensator system 25 is located in a reservoir or recess 27. Reservoir 27 has a base 29 and sidewalls 31 that are substantially cylindrical and stepped. Lubricant passage 21 intersects the sidewalls 31, and a borehole fluid passage, or vent hole 33, intersects base 29. One end of the borehole fluid passage 33 is located in the center of base 29, while the other end is located at the exterior of the bit in the crotch area, to provide means for borehole fluid to enter the lower portion of reservoir 27.

A diaphragm 35, normally of oil resistant rubber or nitrile rubber compound, is inserted in the lubricant reservoir 27, separating lubricant from the borehole fluid that enters passage 33. As shown in FIG. 4, diaphragm 35 is generally cup-shaped with a mouth 37, sidewalls 39, and a bottom 41. A portion of the sidewalls 39 are foldable to allow the bottom 41 to fold inside the sidewalls 39 so as to be positioned as shown in the drawing. Bottom 41 moves along the longitudinal axis of the reservoir 27 in response to pressure differential. The mouth 37 contains an outwardly protruding lip 42 that seats against the reservoir base 29 at the intersection with the reservoir sidewall 31, to seal borehole fluid from the lubricant. A metal disc 43 is bonded to the borehole side of the diaphragm bottom 41 to strengthen the bottom and prevent damage to the diaphragm when it is pressed against the entrance to passage 33. The centering button 45 assures that disc 43 will be centered over passage 33.

A retainer means comprising a rigid metal band or retainer ring 47 is bonded to a portion of the diaphragm sidewalls 39, and bears against the upper edge of the lip 42. A portion of ring 47 extends upward within sidewalls 39 for a selected distance, serving as stiffening means for stiffening a portion of the sidewalls to prevent them from folding. A channel or groove 49 is formed in ring 47 near the edge that contacts lip 42. An O-ring 51 (FIG. 2) is located in groove 49, providing a secondary seal against borehole fluid from entering the lubricant side of reservoir 27. The height of ring 47 is selected to place the diaphragm bottom 41 a selected distance from the entrance to passage 33 when the sidewalls 39 are folded as far as possible as shown in FIG. 4. Consequently, ring 47 serves as bias means for preventing the diaphragm bottom 41 from coming into contact with the entrance to the passage, requiring the folded portion of the sidewalls 39 to stretch in order to fill the void space 52 on the borehole fluid side of the reservoir.

Referring to FIGS. 2 and 3, a protector member 53 encloses the diaphragm 35 to limit expansion. The protector member 53 is generally cup-shaped, with its mouth bearing downwardly against channel 49 of ring 47. The bottom of the protector member contains an aperture 55 for the passage of lubricant.

A cap 57 is secured in the upper end of reservoir 27 by a snap ring 59. Cap 57 is sealed by an O-ring 61 between it and the reservoir sidewalls 31. Referring to FIG. 3, the lower surface of cap 57 contains a recessed channel 63 for the passage of lubricant through the aperture 55. An axial filling passage 65 may be located in cap 57 for the introduction of lubricant. A threaded plug 67 (FIG. 1) seals passage 65 after the reservoir has been filled with lubricant.

In the lubricating operation, the bit and pressure compensator are assembled prior to introducing lubricant. Then the reservoir 27 and passage 21 are preferably evacuated of all the air and gases through nozzle 69, which screws into passage 65. While retaining the vacuum, lubricant is then introduced through nozzle 69. The lubricant is pumped into the reservoir 27 to a pressure of approximately 275 psi (pounds per square inch) to assure complete filling. Details of a satisfactory evacuation and lubrication system are shown in U.S. Pat. No. 4,019,785. Since the lubricant system is positively sealed, the foldable portion of sidewalls 39 will distend, filling substantially all of the void space in the borehole fluid side of the diaphragm. Then pumping pressure is removed by releasing the quick disconnect coupling 71 of nozzle 69. This allows the lubricant pressure to be vented to atmosphere, and the diaphragm to return to its folded, unstretched state, as shown in the drawings. Grease equal to the volume of the void space 52 will be expelled out of the nozzle 69. The nozzle 69 is then removed and the plug 67 screwed in place while the lubricant is at atmospheric pressure.

In the drilling operation, as the bit descends into the well, borehole fluid will enter passage 33 and fill the void space 52 of the reservoir on the borehole fluid side of the diaphragm 35. As hydrostatic pressure increases, the diaphragm bottom 41 will move farther from the entrance to the borehole fluid passage 33, tending to balance the lubricant pressure with the hydrostatic pressure. Also, the geothermal temperature increase as the bit is lowered will heat the lubricant in the reservoir, causing it to expand. This expansion pushes the diaphragm bottom 41 toward the entrance of passage 33, stretching the folded portion of the diaphragm sidewalls 39. Once drilling begins, heat generated by bearing friction and pressure variations will cause the diaphragm to respond accordingly.

A suitable amount of void space on the borehole fluid side to allow for thermal expansion, yet assure sufficient lubricant, is approximately 5%–25% of the volume of the lubricant that fills the reservoir, passages, and spaces in the bearings. A desirable diaphragm for a 7⅞inch bit has its metal disc 43 approximately 7/16 inch from the entrance to passage 33 when fully folded but unstretched, providing a void space of approximately 18% of the volume of lubricant. A lubricant pressure of approximately 22 psi is required to stretch the diaphragm until the disc 43 contacts passage 33. Laboratory tests were conducted with gradual heating of a drill bit constructed in accordance with this invention to 305 degrees F. The lubricant pressure increased to approximately 15 psi at this temperature.

It should be apparent that an invention having significant improvements has been provided. The pressure compensator reduces pressure build-up in the lubricant due to thermal increase, yet does not require a pressure relief valve. Complete filling is assured by overfilling the reservoir, then allowing the excess grease to be expelled. A selected amount of void space in the reservoir on the borehole fluid side of the diaphragm allows room for thermal expansion. While the diaphragm is under varying degrees of stretch, the force required to stretch the diaphragm exerts a pressure on seal 23. This positive pressure tends to prevent leakage of borehole fluid across seal 23 into the bit.

While the invention has been shown in only one of its forms, it should be apparent to those skilled in the art that it is not so limited but is susceptible to various changes and modifications without departing from the spirit thereof. For example, the lubricant dispensing nozzle may be formed integrally with a cap that is removed after filling and replaced by a solid cap for operation.

What is claimed is:

1. In an earth boring drill bit of the type having rotatable cutters mounted on bearing shafts and lubricated by a lubrication system that includes a lubricant reservoir for supplying lubricant to the cutters and a passage extending from the reservoir to the exterior of the bit for the admission of borehole fluid, an improved lubricant compensator comprising:

a flexible cup-shaped diaphragm with sidewalls, a bottom, and a mouth that sealingly surrounds the entrance to the passage; and stiffening means in engagement with a portion of the sidewalls for preventing a portion of the sidewalls from folding, the stiffening means being located intermediate the mouth and bottom, dividing the sidewalls into a folding portion extending from the bottom to the stiffening means and a stiff portion extending from the folding portion to the mouth; the stiffening means being located so that when the folding portion is fully folded and under no pressure differential, a substantial void space exists in the borehole fluid side of the reservoir between the bottom of the diaphragm and entrance to the passage.

2. A method of constructing a rotary rock bit, comprising the steps of:
providing a lubricant reservoir cavity in said bit;
positioning a flexible diaphragm in said lubricant reservoir cavity so that the flexible diaphragm divides the cavity into a lubricant portion and an expansion portion, said flexible diaphragm being resilient and closing only a portion of said reservoir cavity when in a relaxed condition;
filling said lubricant portion of said lubricant reservoir cavity with a lubricant and applying pressure to said lubricant so that said flexible diaphragm is stretched into said expansion portion; and
removing the pressure from said lubricant allowing said flexible diaphragm to relax and withdraw from the expansion portion.

3. A method of constructing a rotary rock bit, comprising the steps of:
providing a lubricant reservoir cavity in said bit;
positioning a flexible diaphragm in said lubricant reservoir cavity so that the flexible diaphragm divides the cavity into a lubricant portion and an expansion portion, said flexible diaphragm being resilient and closing only a portion of said reservoir cavity when in a relaxed condition;
filling said lubricant portion of said lubricant reservoir cavity with a lubricant and applying pressure to said lubricant so that said flexible diaphragm stretches to substantially fill said expansion portion; and
removing the pressure from said lubricant allowing said flexible diaphragm to retreat from the expansion portion.

4. A method of constructing a rotary rock bit, comprising the steps of:
providing a lubricant reservoir bore in said bit, said bore having an open end;
providing a cap to close said open end of said lubricant reservoir bore;
positioning a flexible diaphragm in said lubricant reservoir bore so that the flexible diaphragm divides the bore into a lubricant portion and an expansion portion, said flexible diaphragm being resilient and closing only a portion of said reservoir bore when in a relaxed condition;
filling said lubricant portion of said lubricant reservoir cavity with a lubricant and applying pressure to said lubricant so that said flexible diaphragm stretches to substantially fill said expansion portion; and
removing the pressure from said lubricant allowing said flexible diaphragm to retreat from the expansion portion.

5. A method of constructing a rotary rock bit, comprising the steps of:
providing a lubricant system for said bit including a lubricant reservoir cavity in said bit;
positioning a flexible and resilient diaphragm in said lubricant reservoir cavity so that the flexible diaphragm divides the cavity into a lubricant portion and an expansion portion, with said expansion portion being not less than substantially 5% of the volume of said lubrication system, said flexible diaphragm closing only a portion of said reservoir cavity when in a relaxed condition;
filling said lubricant portion of said lubricant reservoir cavity with a lubricant and applying pressure to said lubricant so that said flexible diaphragm is stretched into said expansion portion; and
removing the pressure from said lubricant allowing said flexible diaphragm to relax and withdraw from the expansion portion.

6. The method of claim 5 wherein said expansion portion is approximately 10% of the volume of said lubrication system.

7. A method of constructing a rotary rock bit, comprising the steps of:
providing a lubrication system for said bit including a lubricant reservoir cavity in said bit;
positioning a flexible and resilient diaphragm in said lubricant reservoir cavity so that the flexible diaphragm divides the cavity into a lubricant portion and an expansion portion, with said expansion portion being not less than substantially 5% of said lubrication system, said flexible diaphragm closing only a portion of said lubricant reservoir cavity when in a relaxed condition;
filling said lubricant portion of said lubricant reservoir cavity with a lubricant and applying pressure to said lubricant so that said flexible diaphragm stretches to substantially fill said expansion portion; and
removing the pressure from said lubricant allowing said flexible diaphragm to retreat from the expansion portion.

8. The method of claim 7 wherein said expansion portion is approximately 10% of the volume of said lubrication system.

9. A method of constructing a rotary rock bit, comprising the steps of:
providing a lubrication system for said bit including a lubricant reservoir bore in said bit, said bore having an open end;
providing a cap to close said open end of said lubricant reservoir bore;
positioning a flexible diaphragm in said lubricant reservoir bore so that the flexible diaphragm divides the bore into a lubricant portion and an expansion portion with said expansion portion being not less than substantially 5% of the volume of said lubricant system, said flexible diaphragm closing only a portion of said reservoir cavity when in a relaxed condition; filling said lubricant portion of said lubricant reservoir cavity with a lubricant and applying pressure to said lubricant so that said flexible diaphragm stretches to substantially fill said expansion portion; and
removing the pressure from said lubricant allowing said flexible diaphragm to retreat from the expansion portion.

10. The method of claim 9 wherein said expansion portion is approximately 10% of the volume of said lubrication system.

11. In an earth boring drill bit of the type having rotatable cutters mounted on bearing shafts and lubricated by a lubrication system that includes a lubricant reservoir for supplying lubricant to the cutters and a passage extending from the reservoir to the exterior of the bit for the admission of borehole fluid, an improved lubricant compensator comprising:

a flexible diaphragm in the reservoir, having sidewalls, a closed end, a mouth in fluid communication with the passage, the sidewalls being foldable to allow the closed end to fold inside the sidewalls and move along the axis of the reservoir in response to pressure differential; and means for retaining the sidewalls at a distance from the mouth that is selected so as to space the closed end from the entrance to the passage when the diaphragm is in a relaxed and folded condition, requiring the diaphragm to stretch in order for the closed end to contact the entrance to the passage.

12. In an earth boring drill bit of the type having rotatable cutters mounted on bearing shafts and lubricated by a lubrication system that includes a lubricant reservoir for supplying lubricant to the cutters and a passage extending from the reservoir to the exterior of the bit for the admission of borehole fluid, an improved lubricant compensator comprising:

a flexible cup-shaped diaphragm with sidewalls, a bottom, and a mouth that sealingly surrounds the entrance to the passage; and a rigid circular band extending from the mouth and rigidly supporting the sidewalls, the height of the band being selected so as to space the bottom a selected distance away from the entrance to the passage when the diaphragm is in a relaxed position and the sidewalls folded at the band, requiring the diaphragm to stretch in order for the bottom to contact the entrance to the passage.

* * * * *